3,435,628
PRESSURE RESPONSIVE SAFETY CONTROL FOR MOTOR DRIVEN COMPRESSOR
Grover M. Russell, Goshen, Ind., assignor to Penn Controls, Inc., Wheaton, Ill., a corporation of Delaware
Filed May 2, 1967, Ser. No. 635,424
Int. Cl. F25b 1/00, 49/00
U.S. Cl. 62—228                                8 Claims

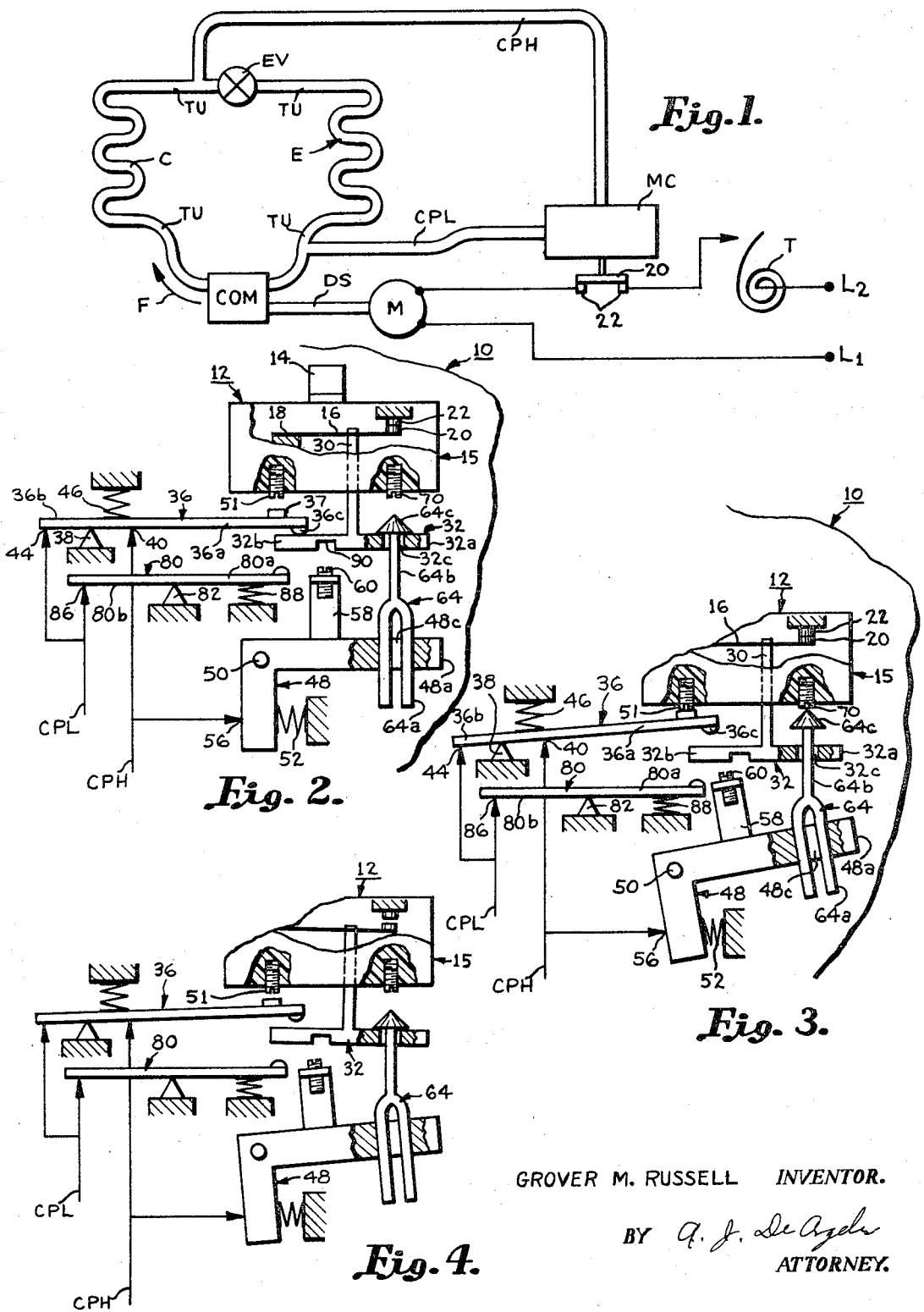

ABSTRACT OF THE DISCLOSURE

A pressure responsive control for a motor driven refrigeration compressor, which control allows starting of the compressor motor only when the differential pressure between the high and low sides of the compressor are within a predetermined setting. The controller incorporates the additional features of high and low pressure limits to shut down the motor. These control functions are accomplished by one pair of normally closed switch contacts in the motor operate circuit, which contacts allow operation of the compressor until the contacts are opened by any one of three actions: minimum low pressure "cut-out," maximum high pressure "cut-out," or any decrease in pressure on the high pressure side of the compressor. The contacts then remain open preventing restarting until the differential pressure between the high and low sides of the compressor equalizes to within the differential pressure setting of the control.

---

This invention relates to pressure responsive electrical switches and, more particularly, to such switches for controlling the operation of compressor motors in refrigeration systems.

In modern day refrigeration systems, motors of low starting torque characteristics are sometimes utilized to drive the compressor. In such systems in order to minimize loading of the driving motor upon starting it is necessary, after each operating cycle, to prevent restarting of the compressor motor until the pressures at the high and low pressure sides of the compressor are within a predetermined relatively small differential pressure.

It is, therefore, desirable to provide a pressure responsive control switch in the operating circuit of the compressor motor, which switch responds to the differential pressure between the high and the low sides of the compressor and prevents restarting of the motor until the differential pressure decreases to at least a maximum amount.

In addition, it is desirable that the pressure responsive switch provided also respond to a maximum pressure condition at the high side of the compressor, termed "high cut-out," and to a minimum pressure condition at its low side, termed "low cut-out," to stop motor operation when either limit is exceeded, thereby protecting the compressor motor from excessive loading and heating under conditions of inordinately high pressure and, under conditions of below minimum pressure, preventing operation with inadequate refrigerant and oil flow.

It is an object of the invention to provide such a pressure responsive control switch of simple and economical construction and using only one pair of electrical contacts.

In carrying out the invention according to the preferred embodiment, the subject control switch provides a pair of normally closed contacts connected in the operating circuit of the compressor motor. These contacts are actuatable by pressure responsive means which are connected through capillary tubing to the high pressure side of the compressor and to its low pressure side and respond to the pressures thereat. Pressure responsive actuators from both the low and the high sides of the compressor engage a first switch operating lever, termed a "differential lever," such that their rotational forces are substantially balanced to zero, under conditions where the differential pressure between the high and low sides of the compressor is within a predetermined maximum for starting the motor. Under these conditions, a spring biases the first lever to maintain the switch contacts in their normally closed condition. However, under conditions where the differential pressure between the high and low sides of the compressor are sensed by the actuators to be above the predetermined starting maximum amount, the high pressure actuator overcomes the rotational forces acting on the first lever due to the biasing spring and the low pressure actuator, causing the first lever to release the switch contacts, thereby allowing the contacts to be opened by other mechanism, as will now be described.

A second switch operating lever, termed a "high pressure lever," is also engaged by the high pressure actuator; the rotational force of which actuator is resisted by a biasing spring selected of a force so as to substantially balance the high pressure actuator under conditions where the differential pressure of the compressor is within the aforementioned maximum amount for starting. An actuating member is mounted on the second lever by means of a friction clutch which allows relative movement therebetween. The member is positioned to move the switch contacts to open condition, interrupting the motor operating circuit, under conditions where any decrease in pressure is sensed at the high pressure side of the compressor. Under such decreasing pressure conditions, the actuator because of its frictional, "slip" engagement with the second lever allows relative movement of that lever under the urging of its biasing spring, as the pressure at the high side decreases towards the maximum pressure differential, thereby maintaining the switch contacts open until the differential between the high and low side of the compressor are substantially equalized. The first lever through its biasing spring then again recloses the switch contacts.

Under conditions where the pressure at the high side exceeds a maximum pressure, the high pressure actuator rotates the second lever against its biasing spring sufficiently to override the first lever contact closing forces and open the switch contacts, interrupting the motor operating circuit.

Pressure at the low side of the compressor below a predetermined minimum is applied to a third lever, termed a "low pressure lever," by a pressure responsive actuator and is resisted by a biasing spring acting on the third lever. This biasing spring is selected of a force so that the third lever is maintained out of engagement with the switch controls, under conditions where the pressure at the low side is above a predetermined minimum. Under conditions where such pressure falls to below the minimum, the biasing spring rotates the third lever to open the contacts in the motor operating circuit, preventing operation of the compressor motor.

The control, thus, acts to allow starting of the compressor motor only under conditions where the differential pressure between high and low sides of the compressor is within a predetermined range and the pressure at the high side is below a predetermined maximum pressure, while that at its low side is at least above a predetermined minimum pressure. During operation, the control opens the switch contacts upon the occurrence of any one of the following three conditions: where the pressure at the high side exceeds the predetermined maximum pressure, that at its low side falls below the predetermined minimum pressure and the occurrence of any decrease in pressure at the high side of the compressor. The latter decrease normally happens, when the refrigeration cycle is terminated by thermostatic controls of the system. The motor operating circuit is then held in this nonoperating condition until the aforementioned initial pressure conditions required for starting are reattained.

Features and advantages of the invention will be seen from the above, from the following description of the preferred embodiment, when considered in conjunction with the drawing, and from the appended claims.

In the drawing:

FIGURE 1 is a simplified diagrammatic representation of a refrigeration system of the electric motor driven type, showing the refrigeration cycle, the motor operating circuit subject to thermostatic control, and embodying the subject invention;

FIGURE 2 is a simplified diagrammatic fragmentary representation in side elevation of the pressure responsive control MC of FIG. 1, shown under conditions where the pressures at the high and low sides of the compressor are within predetermined ranges for safe starting of the system motor.

FIGURE 3 is a view similar to that of FIG. 2 but of only a portion of control MC which is shown under conditions of the compressor being driven by the motor; and FIGURE 4 is a view similar to that of FIG. 3, showing the same portion of control MC but under conditions where the compressor has been stopped by its operating controls and its pressure differential is decreasing toward the maximum starting differential pressure.

With reference to FIG. 1, a standard refrigeration system is shown and includes: a compressor COM, a condenser C, an expansion valve EV and an evaporator E: the components being interconnected by tubing TU, as shown. The system provides a refrigeration cycle of refrigerant from the compressor through the condenser, thence through the expansion valve and the evaporator and back to the compressor in the standard manner, as is indicated by the directional arrow F. M designates an electric motor of any standard type for driving the compressor through drive shaft DS. Electrical power from any convenient source (not shown) is applied over supply lines L1, L2 to energize motor M. A thermostat, generally designated T, has its contacts connected in line L2 in series with a pair of normally closed contacts designated 20, 22 for controlling motor operation. Contacts 20, 22 are part of a motor control safety switch, generally designated MC. Pressures at the high and low pressure sides of compressor COM are applied to motor control MC through standard capillary tubing CPH and CPL, respectively to actuate switch contacts 20, 22 as will be described hereinafter.

In FIG. 2, the pressure responsive motor control MC of FIG. 1 is shown as including within a housing, generally designated 10, a single pole, single throw, snap action type switch, generally designated 12. The switch is attached to housing 10 by means of a mounting bracket 14 fastened to the switch casing 15 in any convenient manner. Such switch may be of the type shown in U.S. Patent 3,255,639 issued to G. M. Russell, and comprises a leaf spring 16 cantilevered at 18 and having a movable contact 20 at its free end for cooperation with a stationary contact 22, as may be seen through the "broken-away" portion of switch casing 15. Leaf spring 16 is biased by inertial switch mechanism (not shown) to maintain contacts 20, 22 normally closed.

Engaging leaf spring 16 intermediate its ends is an actuator 30 of substantially inverted T shape; the horizontal portion or crossbar 32 of the actuator being disposed outside of switch casing 15 in position for engagement by pressure responsive mechanism to actuate the switch.

A lever 36 fulcrumed at 38 in housing 10 has its right arm 36a engaged by a high pressure actuator 40 which is connected to the high side of compressor COM (FIG. 1) by capillary tubing CPH. Actuator 40 (FIG. 2) may be of any suitable standard type so long as it is effective to exert a force on lever 36 tending to rotate the lever counter-clockwise about its fulcrum in response to increases in pressure at the compressor high side. A similar actuator 44, termed a "low pressure actuator" is connected to the low side of compressor COM (FIG. 1) through capillary tubing CPL and engages the left arm 36b (FIG. 2) of lever 36 tending to rotate it clockwise about its fulcrum in response to increases in pressure at the compressor low side. A spring 46 biases lever 36 clockwise about its fulcrum. Spring 46 is selected to exert a force on the lever, which force is sufficient, under conditions of substantially equal pressure between the low and high sides of compressor COM (i.e. within a predetermined maximum starting differential pressure for the compressor—for example, for one tested embodiment, a differential of nine pounds), to rotate lever 36 clockwise sufficiently to cause an extension 36c at the end of right arm 36a of the lever to engage the left portion 32b of the crossbar 32 of actuator 30 and urge the actuator in a counter-clockwise direction about the fastened end of leaf spring 16, to maintain switch contacts 20, 22 in their normally closed condition.

Formed on the upper side of lever arm 36a is an upwardly extending member 37 positioned to engage the bottom of an adjustable stop 51 protruding from switch casing 15 for limiting counter-clockwise movement of lever 36 about its fulcrum. Lever 36 may be termed, a "differential pressure lever."

An L shaped lever 48 is pivotably mounted at 50 on housing 10 and is biased by a spring 52 for clockwise movement against the force exerted by a pressure responsive actuator 56 connected to the high pressure side of compressor COM (FIG. 1) by means of capillary tubing CPH. Spring 52 (FIG. 2) is selected of a force sufficient to maintain lever 48 in what may be termed, "an initial position," as shown, under conditions where the pressure at the compressor high side is substantially low, as for example, where the pressure differential between the high and low sides of the compressor is substantially equalized to within the starting range. Lever 48 may be termed, a "high pressure lever."

Formed on and extending upwardly from the horizontal arm 48a of lever 48 is an elongated member 58. The height of member 58 is selected so that its end engages the left portion 32b of actuator crossbar 32, under conditions where lever 48 is urged counter-clockwise by "high side" pressure responsive actuator 56 against the bias of spring 52 a predetermined amount. Properly dimentioned in height, member 58 acts as a maximum high pressure limit safety, actuating switch 12 to open contact position, under conditions where the pressure at the high side of the compressor exceeds a predetermined maximum safe amount. Under such conditions, member 58 actuates actuator 30 of switch 12 against the internal spring bias acting on lever 16 to snap the switch contacts 20, 22 open, interrupting the energizing circuit of compressor motor M (FIG. 1) to stop the compressor, as will be described hereinafter.

Under normal conditions, where the "high" pressure is maintained below its maximum safe limit, protruding member 58 does not engage switch actuator 30.

An adjustable screw 60 is threaded into the end of member 58 to facilitate adjustment of the height of member 58 to the proper amount.

Lever 48 carries another switch actuating member 64 which is mounted on the lever by means of a frictional engagement therebetween designed to permit relative movement of member 64 with respect to lever 48 in friction clutch fashion. Such friction clutch mounting is provided by means of the bottom portion 64a of member 64 being formed into a fork comprising two tongs of resilient material, which tongs extend through hole 48c formed in horizontal arm 48a of lever 48; the tongs resiliently and frictionally engaging the inside walls of hole 48c. Hole 48c is dimensioned with respect to forked portion 64a so as to permit sliding frictional movement of the forked portion therein when sufficient force is applied to move member 64 relative to its carrying lever 48.

The upper portion of member 64 has a necked down portion 64b on top of which is threaded a cap 64c wider than the inside diameter of hole 32c. Necked down portion 64b extends loosely through a hole 32c formed in crossbar arm 32a of switch actuator 30. With sufficient downward movement of member 64 the bottom flanges of cap 64c engage switch actuator crossbar 32 and exert an actuating force thereon.

An adjustable stop 70 is provided on switch casing 15 in position to engage cap 64c and, thereby, limit upward movement of member 64 when lever 48 is moved counter-clockwise.

A minimum pressure limit for the low pressure side of compressor COM (FIG. 1) is also provided. This limit comprises a lever 80 (FIG. 2) fulcrumed at 82 and having a right arm 80a in position to engage switch actuator crossbar 32b for moving actuator 30 clockwise to open switch contacts 20, 22. A "low side" pressure actuator 86 of any standard design is connected to the low pressure side of the compressor by means of capillary tubing CPL. Actuator 86 engages the left arm 80b of lever 80 and urges the lever clockwise about its fulcrum in response to pressure increases at the compressor low side. The force exerted by "low" pressure actuator 86 on lever 80 is opposed by a biasing spring 88 which engages the right arm 80a of the lever and urges the lever counter-clockwise. Spring 88 is selected of a force such that under conditions where the force applied to lever 80 by low pressure actuator 86 is below a predetermined minimum amount (as when the pressure at the "low" pressure side of the compressor falls below a predetermined safe limit), spring 88 moves lever 80 counter-clockwise sufficiently to cause lever arm 80a to engage crossbar 32 of actuator 30 and actuate switch contacts 20, 22 to open condition, interrupting the energizing circuit of compressor motor M (FIG. 1). Lever 80 may be termed, a "low pressure lever."

It may be noted that spring 88 is selected of sufficient strength to override the previously described force being exerted by "differential pressure lever" 36 on actuator 30, tending to maintain switch contacts 20, 22 in their normally closed condition.

To demonstrate the operation of motor control MC, assume that the pressure at the low and high sides of compressor COM (FIG. 1) are within the operating ranges of the compressor and the differential pressure between the high and low sides of the compressor is within the maximum permitted for starting the compressor, say nine pounds. Under such conditions, motor control mechanism MC is in the condition shown in FIG. 2 with switch contacts 20, 22 in their normally closed position, preparing the energizing circuit (FIG. 1) for compressor motor M for operation. As stated before, the forces from "low" pressure actuator 44 and "high" pressure actuator 40 acting on "differential pressure lever" 36 are balanced against each other and against the bias of spring 46 such that spring 46 is effective to keep lever 36 in engagement with actuator 30 of switch 12, maintaining the switch contacts closed.

Next assume that there is a call for refrigeration by thermostat T (FIG. 1) closing its contacts, completing an energizating circuit for compressor motor M over supply lines L1, L2 through presently closed motor control switch contacts 20, 22. Motor M operates, driving compressor COM. With such operation pressure at the high pressure side of compressor COM begins to increase, while that at the low side decreases. The increase in pressure is transmitted through capillary tubing CPH to "high side" pressure responsive actuators 40 and 56 (FIG. 2) of motor control MC. "High side" actuator 40 urges differential pressure lever 36 counter-clockwise about its pivot 38 against the forces exerted by "low side" actuator 44 and biasing spring 46, sufficiently to cause the end 36c of lever 36 to release switch actuator 30. However, actuator 30 remains in its closed contact position due to the internal bias of the switch.

Differential pressure lever 36 continues to be moved counter-clockwise by "high side" actuator 40 until it limits against stop 51 as is shown in FIG. 3.

At the same time, high side actuator 56 urges "high pressure lever" 48 counter-clockwise about its pivot 50 against the force of its biasing spring 52. As lever 48 moves counter-clockwise, it carries with it forked member 64. As member 64 is, thus, carried upward, its necked down portion 64b moves freely through hole 32c in switch actuator 30, without effect at this time. Continued rotation of lever 48 counter-clockwise moves member 64 upward until its cap 64c bottoms against adjustable stop 70 on switch casing 15, as is shown in FIG. 3. As lever 48 continues to be moved counter-clockwise, member 64, due to its friction clutch mounting, remains stationary; lever 48 sliding upward over the resilient tongs of forked portion 64a.

It may be noted that, as was previously stated, should the high side of the compressor attain a pressure above a certain maximum safe limit, high pressure lever 48 is moved sufficiently counter-clockwise by high side actuator 56 to cause protruding member 58 carried by the lever to engage switch actuator 30 and actuate the switch to open contact condition, interrupting the compressor motor circuit and, thereby, stopping compressor operation.

Next assume that the amount of refrigeration called for by thermostat T (FIG. 1) has been satisfied by the system, causing the thermostat to open its contacts, interrupting the compressor motor operating circuit and stopping the motor. Under such conditions, it is desirable to prevent restarting of the compressor motor until the differential pressure between the low and the high sides of the compressor has equalized to a certain predetermined amount, say, for example, to a nine pound differential. Motor control MC prevents restarting of the compressor motor even though the thermostat again calls for operation by maintaining the switch contacts 20, 22 open until such equalization of pressure. This is accomplished as follows: immediately upon stopping the compressor (either due to a limit condition being exceeded or to thermostat action) the pressure at the high side of the compressor begins to decrease and that at the low side to increase. With the first minute decrease in such high side pressure, the force exerted upon high pressure lever 48 by high side actuator 56 decreases, causing biasing spring 52 to rotate lever 48 clockwise about its pivot 50 a small amount. Lever 48 in rotating clockwise an initial amount carries member 64 with it downward. Member 64 in moving downward, by means of its relatively large cap 64c, engages crossbar 32 of switch actuator 30, moving the actuator clockwise (as is shown in FIG. 4) to open switch contacts 20, 22 in the compressor motor operating circuit, preventing operation of the compressor motor even should the thermostat contacts reclose and again call for refrigeration.

Simultaneously therewith, the force exerted by high side actuator 40 on differential pressure lever 36 also decreases, allowing that lever, due to the force of spring 46, to begin moving clockwise from its upper limit position of FIG. 3 to that of FIG. 4, but without effect at this time.

As the high side pressure continues to decrease, high pressure lever 48 continues to move clockwise under the influence of its biasing spring 52. Lever 48, thus, frictionally slides over the forked portion 64a of member 64, maintaining open contact pressure on switch actuator 30 to keep switch contacts 20, 22 in open condition against the internal bias of switch 12.

The pressure at the "high pressure" side of the compressor continues to decrease while that at the "low" side continues to increase until the pressure differential therebetween approaches the desired nine pounds at which restarting of the motor is permitted. As this desired maximum pressure differential is attained, the forces exerted on differential pressure lever 36 by high 40 and low 44 pressure actuators substantially equalizes and the bias of spring 46 on the lever becomes effective to rotate lever 36 clockwise sufficiently to cause its end 36c to reengage actuator crossbar 32 of switch 12. Differential pressure lever 36 moves switch actuator 30 counter-clockwise against the force being exerted on it by member 64, causing member 64 to slip upward relative to high pressure lever 48 which continues to be driven clockwise by its spring 52. Differential pressure lever 36, thus, overcomes the forces exerted on switch actuator 30 by high pressure lever 48 and member 64 sufficiently to actuate switch contacts 20, 22 to closed position (FIG. 2) again preparing the motor operating circuits for reenergization through thermostat T.

To describe the operation of the minimum "low" pressure limit of control MC, assume that, during operation, the pressure at the low side of the compressor falls to below a certain safe minimum. Under such conditions, low pressure actuator 86 exerts such little force on low pressure lever 80, tending to rotate it clockwise that biasing spring 88 becomes sufficiently effective to rotate lever 80 counter-clockwise, causing arm 80a of the lever to engage switch actuator 30 and exert sufficient force thereon to actuate switch contacts 20, 22 open, stopping operation of the compressor motor. As actuator 30 is, thus, moved clockwise, its arm 32a, due to hole 32c, moves freely over necked down portion 64b of member 64, without affecting member 64.

Low pressure lever 80 and its biasing spring 88 are selected so as to, under conditions of below minimum low pressure, override the force exerted on switch actuator 30 by differential pressure lever 36 and actuate contacts 20, 22 open.

It may be noted that, under conditions where the maximum pressure on the high side of the compressor is exceeded, high pressure lever 48, as was previously described, through its upwardly extending portion 58 actuates switch contacts 20, 22 to open condition, disabling the compressor motor operating circuits. When the pressure at the high side of the compressor decreases, clockwise movement of lever 48 by its biasing spring 52, previously described, causes member 64 to engage actuator 30, as member 64 is carried downward by lever 48, and maintain switch contacts 20, 22 open. This occurs prior to maximum limit portion 58 of lever 48 disengaging switch actuator 30. This is a "make-before-break type" sequence in which member 64 engages actuator 30 to maintain switch contacts 20, 22 open before maximum limit portion 58 releases switch actuator 30. This "make-before-break" operation is provided by notch 90 formed in crossbar portion 32b and prevents the internal bias of switch 12 from automatically reclosing switch contacts 20, 22.

It is, thus, seen that the subject control with one pair of switch contacts provides a maximum high pressure limit, a minimum low pressure limit and allows restarting of the compressor motor only under conditions where the compressor pressures return to within such limits, and the differential pressure between its high and low sides are within a predetermined maximum differential. The compressor motor is stopped by control MC whenever such high and low limits are exceeded or, any decrease in pressure at the high side of the compressor is sensed.

As many changes can be made in the above described construction and many apparently different embodiments of this invention can be made without departing from the scope thereof, it is intended that all matter contained in the above description or shown in the accompanying drawing be interpreted as illustrative only and not in a limiting sense.

What is claimed is:

1. In a refrigeration system including a compressor, a motor for driving the compressor, and means for controlling operation of said motor including a thermostat, a safety control functioning as a circuit interrupt safety switch for interrupting the motor operating circuit, said compressor during operation generating high pressure of refrigerant at its outlet side and a relatively low pressure at its inlet side, said safety control comprising;

a first pressure sensor responsive to the pressure at the high side of the compressor, a second pressure sensor responsive to the pressure at the low side of the compressor, circuit interrupting means for interrupting said motor operating circuits, characterized in that said circuit interrupting means are responsive to said pressure sensors for interrupting said motor circuit, under each of the following conditions: where pressure at the said high pressure side is sensed by said first sensor to exceed a predetermined maximum pressure, pressure at said low pressure side is sensed by said second sensor to fall below a predetermined minimum pressure, and the pressure at said high side is sensed by said first sensor to decrease at least a certain minimal increment;

said circuit interrupting means maintaining said motor circuits inoperative, until the pressure differential between said high and low sides is sensed by said first and second sensors to be at least below a certain maximum starting amount, before preparing said motor circuits for restarting the motor by said thermostat.

2. A control as set forth in claim 1 wherein said circuit interrupting means comprises, a switch having a pair of contacts spring biased to normally closed position in the motor operating circuit, a first actuator for actuating said contacts against their internal spring bias to open condition, a first lever biased by a spring into engagement with said switch actuator in a direction to maintain said contacts in normally closed condition, and wherein said first lever is engaged by a first pressure actuator of said high side sensor and by a first one from said low side sensor at points to substantially equalize their forces tending to rotate said first lever, under conditions where the pressures at the low and high side of the compressor are sensed to be substantially equal, a second lever is provided and is biased by a second spring in a first direction, a second actuator of said high side sensor actuates said second lever against the bias of said second spring, said second high side actuator and biasing second spring, under conditions where said high and low pressures are substantially equalized, positioning said second lever in a first predetermined position;

a protruding portion formed on said second lever in position to engage said first actuator, under conditions where said second high side actuator urges said second lever in said first predetermined direction against said second spring bias a predetermined amount when said high side pressure exceeds a predetermined safe limit, to actuate said switch contacts to open condition, a second actuator carried by said second lever, slip clutch means mounting said second actuator on said lever to allow bidirectional relative motion therebetween, a portion formed on said second actuator for engaging said first actuator to open said contacts, under conditions where said second actuator is carried in a predetermined direction a minimal amount by said second lever, and an adjustable stop positioned for engaging said second actuator, under conditions where it is moved in a direction opposite to said predetermined direction to a certain limit position, stopping said second actuator.

3. A safety control for a refrigeration system having a compressor and its electrically powered driving motor, said motor being electrically interconnected for energization from an electrical power source through a thermostatic control, said compressor during operation generating high pressure of refrigerant at its outlet side and low pressure at its inlet side, said safety control including a pair of normally closed electrical contacts in the energizing circuit of said motor, first pressure sensor means operatively connected to the high pressure side of said compressor and responsive to pressures thereat for actuating control mechanism, second pressure sensor means operatively connected to the low pressure side of said compressor and responsive to pressures thereat also for actuating control mechanism, characterized in that there is provided;

differential pressure responsive mechanism actuatable in opposite directions by said high and low pressure sensors, respectively, said differential pressure responsive mechanism being operative, under conditions where the differential pressure between said high and low sides of said compressor is equalized to within a certain starting maximum differential pressure, to maintain said normally closed switch contacts in their normally closed condition, said differential pressure responsive mechanism, under conditions where said differential pressure exceeds said certain starting maximum differential, releasing said switch contacts permitting their actuation to open condition, high pressure responsive mechanism actuatable by said high side pressure sensor, under conditions where any incremental decrease in pressure at said high side is sensed and said differential mechanism has released said switch contacts, for actuating said switch contacts to open position interrupting the motor energizing circuit.

4. A safety control for a refrigeration system as set forth in claim 3 wherein said high pressure responsive mechanism includes an actuating member and a lever, said lever being directly responsive to said high pressure sensor, and said actuating member being mounted on said lever by friction clutch means for movement therewith under conditions where no external restraining forces are exerted on said actuating member, said actuating member when carried by its lever in response to said sensed incremental pressure decrease at said high side actuating said contacts open, said actuating member, under conditions where it engages said contacts and actuates them to open position, being restrained sufficiently to slip with respect to its said lever, said differential pressure mechanism including a biasing spring selected of a sufficient force to, under conditions where said differential pressure is equalized to within said maximum starting limit, actuate said switch contacts to their normally closed condition overriding the forces exerted by said high pressure mechanism tending to maintain the contacts open by causing sliding movement between said actuating member and its said high pressure lever.

5. A safety control for a refrigeration system as set forth in claim 3 wherein there is provided low pressure responsive mechanism actuated by said low side pressure sensor for actuating said switch contacts to open condition interrupting the motor energizing circuit, under conditions where pressure at said low side is sensed to be at a pressure below a predetermined safe minimum pressure.

6. A safety control for a refrigeration system as set forth in claim 5 wherein said low pressure responsive limit mechanism includes a lever directly responsive to said low pressure sensor, and spring means selected of sufficient strength and biasing said lever against the force of said low side sensor for actuating said switch contacts through said lever to open position, under conditions where the pressure exerted on said lever by the low pressure sensor falls below said predetermined minimum limit.

7. A safety control for a refrigeration system as set forth in claim 4 wherein said lever of said high pressure is provided with an extension formed thereon in position to actuate said switch contacts to open condition interrupting the motor energizing circuit, under conditions where said high pressure lever is actuated by said high pressure sensor sufficiently in response to the pressure at said high side exceeding a predetermined safe maximum limit.

8. A safety control for a refrigeration system having a compressor and a motor for driving said compressor, said compressor during operation generating high pressure of refrigerant at its outlet side and low pressure at its inlet side, said control including a pair of normally closed electrical contacts in the motor operating circuit, a pressure sensor responsive to the pressures at the high pressure side of the compressor, a pressure sensor responsive to the pressures at the low pressure side of said compressor, a contact actuator operatively connected to said contacts for moving said contacts from open to closed position, characterized in that there is provided:

a first lever positioned for engaging said contact actuator, said pressure sensor oppositely engaging said first lever in position to substantially equalize their forces acting on said first lever, under conditions were the pressure between said high and low sides of said compressor is sensed to be within a predetermined maximum differential pressure for starting said motor, a spring biasing said first lever and of sufficient force to, under such maximum differential pressure conditions, maintain said contact actuator in closed contact position, a second lever positioned to actuate said contact actuator, a spring biasing said second lever into engagement with said contact actuator in a direction to cause opening of said contacts, said low pressure sensor urging said second lever in a direction opposite to contact opening direction, said second lever spring urging said second lever to move said contact actuator sufficiently to open said switch contacts, under conditions where the pressure at said low side is sensed to be below a minimum low limit, a third lever, an actuating member carried by said third lever, friction clutch means mounting said actuating member on said third lever to provide bidirectional relative movement therebetween, said actuating member being structured to engage said contact actuator only under conditions where said third lever is moved toward a contact opening direction to open said switch contacts, said third lever being responsive to said high pressure sensor for movement in a first direction, a spring biasing said third lever toward contact opening direction against said high pressure sensor and of sufficient force to cause, under conditions of any decrease in pressure at said high side of said compressor, engagement of said contact actuator by said carried actuating member to open said switch contacts.

References Cited

UNITED STATES PATENTS 2,218,944   10/1940   Wolfert _____ 62—228 XR

MEYER PERLIN, *Primary Examiner.*

UNITED STATES PATENT OFFICE
CERTIFICATE OF CORRECTION

Patent No. 3,435,628                                                 April 1, 1969

Grover M. Russell

It is certified that error appears in the above identified patent and that said Letters Patent are hereby corrected as shown below:

Column 3, line 66, "inertial" should read -- internal --. Column 10, line 30, "sensor" should read -- sensors --.

Signed and sealed this 7th day of April 1970.

(SEAL)
Attest:

Edward M. Fletcher, Jr.                                  WILLIAM E. SCHUYLER, JR.
Attesting Officer                                              Commissioner of Patents